(12) United States Patent
Saiki et al.

(10) Patent No.: US 8,097,569 B2
(45) Date of Patent: Jan. 17, 2012

(54) COATING COMPOSITION FOR USE IN SLIDING PARTS

(75) Inventors: Akio Saiki, Kariya (JP); Noriyuki Shintoku, Kariya (JP); Noriaki Baba, Kariya (JP); Toshihisa Shimo, Kariya (JP); Hitotoshi Murase, Kariya (JP); Tetsuji Yamaguchi, Kanagawa-ken (JP); Jiro Yamashita, Kanagawa-ken (JP); Takahiro Sugioka, Kariya (JP)

(73) Assignees: Kabushiki Kaisha Toyota Jidoshokki, Aichi-Ken (JP); Dow Corning Toray Co., Ltd., Tokyo (JP)

( * ) Notice: Subject to any disclaimer, the term of this patent is extended or adjusted under 35 U.S.C. 154(b) by 734 days.

(21) Appl. No.: 10/823,199

(22) Filed: Apr. 13, 2004

(65) Prior Publication Data

US 2004/0224856 A1 Nov. 11, 2004

(30) Foreign Application Priority Data

Apr. 14, 2003 (JP) ................. 2003-109597

(51) Int. Cl.
*C10M 177/00* (2006.01)
*F16C 33/04* (2006.01)
*C04B 14/00* (2006.01)

(52) U.S. Cl. ............... 508/181; 508/107; 106/400

(58) Field of Classification Search .......... 252/12; 106/400; 508/108, 107, 181; 525/104, 180, 525/184

See application file for complete search history.

(56) References Cited

U.S. PATENT DOCUMENTS

| | | | |
|---|---|---|---|
| 4,626,365 A * | 12/1986 | Mori | 508/106 |
| 4,724,251 A * | 2/1988 | Rock | 525/104 |
| 4,742,110 A * | 5/1988 | Sakashita et al. | 524/538 |
| 5,306,739 A * | 4/1994 | Lucey | 522/42 |
| 5,356,971 A | 10/1994 | Sagawa et al. | 524/275 |
| 5,486,299 A * | 1/1996 | Fuwa et al. | 508/106 |
| 5,621,042 A * | 4/1997 | Hanada et al. | 525/102 |
| 5,948,339 A * | 9/1999 | McDermott et al. | 264/328.17 |
| 6,378,415 B1 | 4/2002 | Sugiura et al. | 92/71 |
| 6,476,116 B1 * | 11/2002 | Egami et al. | 524/495 |
| 6,500,537 B1 * | 12/2002 | Araki et al. | 428/355 EN |
| 6,524,661 B2 * | 2/2003 | Bagala et al. | 427/475 |
| 6,627,298 B2 * | 9/2003 | Koyama et al. | 428/195.1 |
| 6,790,522 B2 * | 9/2004 | Yamazaki et al. | 428/842.8 |
| 2002/0039640 A1* | 4/2002 | Koyama et al. | 428/195 |
| 2002/0161091 A1* | 10/2002 | Amou et al. | 524/425 |
| 2003/0072969 A1* | 4/2003 | Yamazaki et al. | 428/694 BM |

FOREIGN PATENT DOCUMENTS

| | | |
|---|---|---|
| CN | 1073968 | 7/1993 |
| CN | 1227241 A | 9/1999 |
| CN | 1104342 C | 4/2003 |
| EP | 0 546 522 A1 | 6/1993 |
| EP | 1 031 726 A2 | 8/2000 |
| EP | 1 188 924 A2 | 3/2002 |
| GB | 1 585 644 | 3/1981 |
| JP | 63-120916 | 5/1988 |
| JP | 03-285952 A | 12/1991 |
| JP | 05-071528 | 3/1993 |
| JP | 07-259770 | 10/1995 |
| JP | 08-217941 A | 8/1996 |
| JP | 09-012967 A | 1/1997 |
| JP | 09-099517 A | 4/1997 |
| JP | 10-037962 A | 2/1998 |
| JP | 10-246192 | 9/1998 |
| JP | 01255798 | * 10/1998 |
| JP | 11-071521 A | 3/1999 |
| JP | 2001-011372 | 1/2001 |
| JP | 2001-226588 A | 8/2001 |
| WO | 97/39073 | 10/1997 |

OTHER PUBLICATIONS

Japanese Office Action mailed on Apr. 21, 2009 for Japanese Patent Application No. 2003-109597 (English translation provided).

T. Imai et al., *Available techniques and development of a silane coupling agent*, Japan Energy and Technology Intelligence (JETI), 1995, pp. 136-139, vol. 43, No. 10 (Partial English translation provided).

* cited by examiner

*Primary Examiner* — Anthony Green
*Assistant Examiner* — Pegah Parvini
(74) *Attorney, Agent, or Firm* — Locke Lord LLP

(57) ABSTRACT

A compressor includes a swash plate, and a shoe connected to an outer periphery of the swash plate. A surface of the swash plate slides upon a flat surface of the shoe. A sliding film is applied to the surface of the swash plate. The sliding film is formed of binder resin which contains a solid lubricant and titanium oxide powder. This allows the surface of the swash plate and the flat surface of the shoe to smoothly slide upon each other.

9 Claims, 9 Drawing Sheets

COATING COMPOSITION FOR USE IN SLIDING PARTS

BACKGROUND OF THE INVENTION

The present invention relates to a compressor.

Japanese Laid-Open Patent Publication No. 2002-89437, for example, discloses a compressor having a housing in which a plurality of cylinder bores, a crank chamber, a suction chamber, and a discharge chamber are formed. The compressor is incorporated into a refrigeration circuit including an evaporator, a suction device, and a condenser. Each cylinder bore of the compressor accommodates a corresponding piston, while permitting the piston to reciprocate. A drive shaft rotatably supported by the housing is driven by an external drive source such as an engine. A swash plate is supported on the drive shaft rotatably in synchronization therewith. The swash plate is connected to the piston with pairs of hemispherical shoes. A sliding film is formed on a surface of the swash plate that slides upon a flat surface of the shoes. The sliding film is formed of a binder resin which contains a solid lubricant such as molybdenum disulfide.

When the drive shaft is driven by the external drive source, the swash plate rotates in synchronization therewith to cause the piston to reciprocate within the cylinder bore via the shoes. In each cylinder bore, a compression chamber is defined that changes in volume depending on reciprocating movement of a piston head. When the piston moves from the top dead center to the bottom dead center, a low pressure refrigerant gas is drawn into the compression chamber from the suction device connected to the evaporator in the refrigeration circuit. On the other hand, when the piston moves from the bottom dead center to the top dead center, a high pressure refrigerant gas is discharged into the discharge chamber from the compression chamber. The discharge chamber is connected to the condenser in the refrigeration circuit. The refrigeration circuit is used for air conditioning of a vehicle as an air conditioning system for a vehicle.

For this compressor, the sliding film applied to the surface of the swash plate allows the flat surface of the shoe to smoothly slide, thus preventing rattles of the swash plate and the shoes by wear of at least one of them or failures resulting from seizure therebetween.

In the conventional compressor, further improved sliding properties are desired under severe conditions such as where not only the surface of the swash plate and the flat surface of the shoes, but also a first sliding surface of a first member and a second sliding surface of a second member slide upon each other at high speed or under a relatively heavy load such as a high heat load. Thus, it can be considered to increase the content of solid lubricant, for example, to increase the content of molybdenum disulfide in the sliding film to 10% by mass or more and thereby improve seizure resistance between the first member and the second member. However, if the content of solid lubricant is increased, the solid lubricant will be apt to drop out of the film, resulting in increased wear depth of the sliding film.

SUMMARY OF THE INVENTION

An object of the invention is to provide a compressor having good sliding properties.

In order to achieve the above described object, the present invention provides a compressor having a first a first member having a first sliding surface, and a second member having a second sliding surface. One of the sliding surfaces slides on the other sliding surface. A sliding film made of a binder resin is formed on at least one of the first sliding surface and the second sliding surface the binder resin contains at least solid lubricant and inorganic particles.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Now, a first embodiment of the invention will be described with reference to FIGS. 1 to 8.

Figure 1:
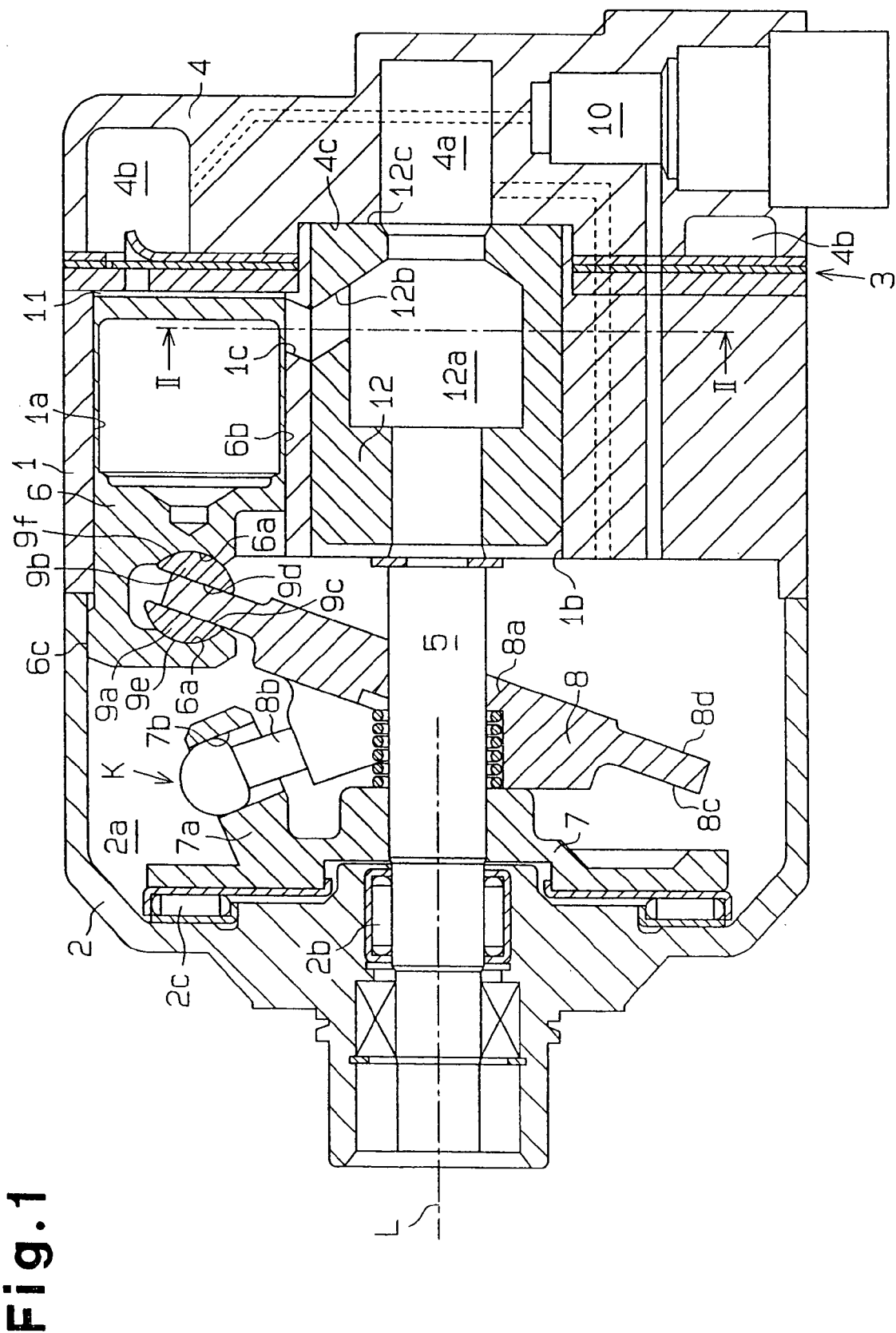
FIG. 1 is a cross-sectional view of a compressor according to a first embodiment of the present invention.

As shown in FIG. 1, a variable displacement swash plate type compressor includes a cylinder block 1 made of an aluminum-based alloy, a front housing member 2 made of an aluminum-based alloy and secured to a front end of the cylinder block 1, and a rear housing member 4 made of an aluminum-based alloy and secured to a rear end of the cylinder block 1 via a valve mechanism 3 including a valve plate, a discharge valve, and a retainer. A crank chamber 2a is defined between the cylinder block 1 and the front housing member 2. A suction chamber 4a and a discharge chamber 4b are defined in the rear housing member 4. In this embodiment, the cylinder block 1, the front housing member 2, and the rear housing member 4 constitute the housing. The suction chamber 4a is connected to an evaporator (not show), the evaporator is connected to a condenser (not show) via an expansion valve (not show), and the condenser is connected to the discharge chamber 4b. The compressor, the evaporator, the expansion valve, and the condenser constitute an air conditioning refrigeration circuit for a vehicle. In the drawings, the left is the front side, and the right is the rear side.

Figure 2:
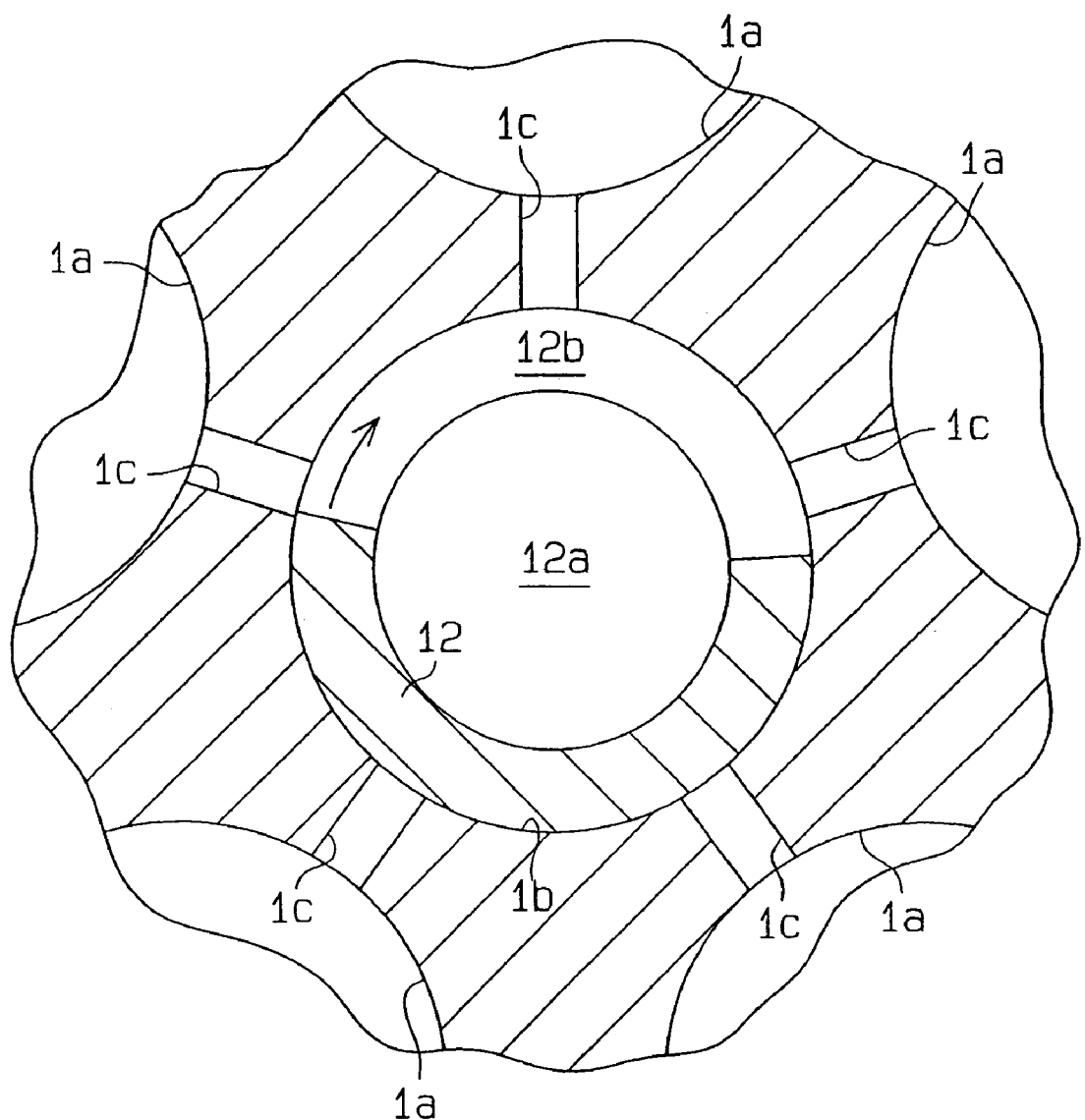
FIG. 2 is a cross-sectional view taken along line II-II.

In the front housing member 2, a drive shaft 5 made of an iron-base alloy is rotatably supported via a radial bearing 2b. As shown in FIG. 2, a plurality of cylinder bores 1a (only one is shown in FIG. 1) are formed at constant intervals around an axis L of the drive shaft 5. Each cylinder bore 1a accommodates a single-headed piston 6 made of an aluminum-based alloy, while permitting the piston 6 to reciprocate. In each cylinder bore 1a, a compression chamber 11 is defined that changes in volume depending on reciprocating movement of the piston 6. As shown in FIG. 1, a rotary valve chamber 1b extending in parallel with the axis L of the drive shaft 5 passes through a center of the cylinder block 1. The rotary valve chamber 1b receives a rotary valve 12 rotatably in synchronization with the drive shaft 5. The rotary valve 12 has an introduction chamber 12a communicating with the suction chamber 4a, and a suction guide groove 12b communicating with the introduction chamber 12a. The suction guide groove 12b extends radially. The cylinder block 1 has a plurality of radially extending suction passages 1c that connect the compression chamber 11 of each cylinder bore 1a with the introduction chamber 12a via the suction guide groove 12b (see FIG. 2).

A lug plate 7 made of an iron-base alloy is secured onto the drive shaft 5 in the crank chamber 2a. A swash plate 8 made of an iron-base alloy is supported on the drive shaft 5. The swash plate 8 slides along and is inclined with respect to the axis L of the drive shaft 5. A hinge mechanism K is located between the lug plate 7 and the swash plate 8. Thus, the swash plate 8 is connected to the lug plate 7 via the hinge mechanism K. The hinge mechanism K rotates the swash plate 8 integrally with the lug plate 7 and also guides the slide and the inclination of the swash plate 8 with respect to the axis L of the drive shaft 5.

The hinge mechanism K includes a pair of guide holes 7b and a pair of guide pins 8b. The lug plate 7 has a pair of arms 7a, and each guide hole 7b is formed in one of the arms 7a, respectively. The guide pins 8b are fixed to the swash plate 8. Each guide pin 8b has, at its tip, a spherical part, which fitted in the corresponding one of the guide holes 7b. A through hole 8a passes through a center of the swash plate 8, and the drive shaft 5 is inserted into the through hole 8a. Pairs of hemispherical shoes 9a and 9b made of iron-base alloy are provided on an outer periphery of the swash plate 8. An end of each piston 6 is connected to the outer periphery of the swash plate 8 via a pair of the shoes 9a, 9b. Thus, rotation of the swash plate 8 is converted into reciprocation of the piston 6 depending on inclination angle of the swash plate 8.

The rear housing member 4 accommodates a control valve 10 connected to the suction chamber 4a, the discharge chamber 4b, and the crank chamber 2a. The control valve 10 controls pressure in the crank chamber 2a. Depending on the pressure control, the inclination angle of the swash plate 8 is changed to control the displacement.

The compressor includes various first sliding surfaces of first members and various second sliding surfaces of second members that slide upon each other. A sliding film is applied to such surfaces as described below.

The sliding film is formed of coating composition for use in sliding parts which contains a binder resin, a solid lubricant, and inorganic particles mixed with each other, or coating composition for use in sliding parts which contains a binder resin, a solid lubricant, inorganic particles, and a coupling agent mixed with each other. The coating composition for use in sliding parts is coated on at least one of the first sliding surfaces and the second sliding surfaces of the compressor, and then heated, to thereby form the sliding film. The obtained sliding film contains a solid lubricant and inorganic particles, or a solid lubricant, inorganic particles, and a coupling agent in the cured binder resin.

As the binder resin, is employed one having an excellent heat resistance, such as polyimide resin composed of polyamide-imide, polyimide, etc., an epoxy resin or a phenol resin. Of the above resins, polyamide-imide is optimally used, taking into consideration the cost and the properties as a binder resin. The resins in the uncured state are used in the coating composition for use in sliding parts of this invention.

As the solid lubricant, is employed polytetrafluoroethylene (PTFE), ethylene tetrafluoroethylene (ETFE), tetrafluoroethylene-hexafluoropropylene copolymer (FEP), molybdenum disulfide, or graphite.

As the inorganic particles, is employed titanium oxide powder, alumina powder, silica powder or silicon carbide powder. The inorganic particles are preferably of titanium oxide powder. According to the test results obtained by the inventors, a sliding film using alumina powder, silica powder or silicon carbide powder is good in wear resistance but poor in seizure resistance. On the other hand, a sliding film using titanium oxide powder as inorganic particles is good in wear resistance and seizure resistance. It is considered that the titanium oxide powder has excellent dispersability in the binder resin, produces large effect of providing the sliding film with surface smoothness and preventing the solid lubricant from dropping out of the film, and thus has markedly improved wear resistance. Any of anatase, rutile, or brookite titanium oxide powder may be employed. Rutile titanium oxide powder is optimally used, taking into consideration the degradation of the binder resin by photocatalysis and the cost.

Preferably the average primary particle diameter of titanium oxide powder is 1 μm or less. Titanium oxide powder having an average primary particle diameter of 1 μm or less has excellent dispersability in the binder resin and produces large effect of providing the sliding film with surface smoothness and preventing the solid lubricant from dropping out of the film. Further, titanium oxide powder having an average primary particle diameter of 1 μm or less makes it possible to constitute an optimum sliding film for a small gap between a first sliding surface of a first member and a second sliding surface of a second member that slide upon each other through the small gap.

In the sliding film, the content of solid lubricant in a binder resin is preferably in the range between 15% by mass to 100% by mass, inclusive, and more preferably in the range between 30% by mass and 80% by mass, inclusive. If the content of solid lubricant in a binder resin is less than 15% by mass, the seizure resistance of the sliding film becomes poor, whereas if the content of solid lubricant in binder resin is more than 100% by mass, the improvement in the seizure resistance of the sliding film becomes small and the solid lubricant becomes apt to drop out of the film, resulting in an increased wear depth of the sliding film.

In the sliding film, the content of inorganic particles is preferably in the range between 5% by mass to 35% by mass, inclusive, and more preferably in the range between 10% by mass and 20% by mass, inclusive. If the content of titanium oxide powder in binder resin is less than 5% by mass, the effect of decreasing the wear depth of the sliding film becomes insufficient, whereas if the content of titanium oxide powder in binder resin is more than 35% by mass, the effect of decreasing the wear depth of the sliding film becomes small.

Further, in the sliding film, the content of coupling agent in the binder resin is preferably in the range between 0.1% by mass and 10% by mass, inclusive, and more preferably in the range between 2% by mass and 8% by mass, inclusive. If the content of coupling agent in binder resin is less than 0.1% by mass, the seizure resistance of the sliding film becomes insufficient, whereas if the content of coupling agent in binder resin is more than 10%, the effect of improving the seizure resistance of the sliding film becomes small.

As the coupling agent, is employed a silane coupling agent, a titanate coupling agent, or an aluminate coupling agent. According to the test results obtained by the inventors, it is preferable to employ a silane coupling agent. Silane coupling agents usable include: for example, vinyltrichlorosilane, vinyltrimethoxysilane, vinyltriethoxysilane, 2-(3,4-epoxycyclohexyl)ethyl trimethoxysilane, 3-glycidoxypropyl trimethoxysilane, 3-glycidoxypropyl methyldiethoxysilane, 3-glycidoxypropyl triethoxysilane, p-styryltrimethoxysilane, 3-methacryloxypropyl methyl dimethoxysilane, 3-methacryloxypropyl trimethoxysilane, 3-methacryloxypropyl methyl diethoxysilane, 3-methacryloxypropyl triethoxysilane, 3-acryloxypropyl trimethoxysilane, N-2(aminoethyl)3-aminopropyl methyl dimethoxysilane, N-2(aminoethyl)3-aminopropyl trimethoxysilane, N-2(aminoethyl)$_3$-aminopropyl triethoxysilane, 3-aminopropyl trimethoxysilane, 3-aminopropyl triethoxysilane, 3-triethoxysilyl-N-(1,3-dimethyl-butylidene)propylamine, N-phenyl-3-aminopropyl trimethoxysilane, hydrochloride of N-(vinylbenzyl)-2-aminoethyl-3-aminopropyl trimethoxysilane, a special aminosilane, 3-ureidopropyl triethoxysilane, 3-chloropropyl trimethoxysilane, 3-mercaptopropyl methyldimethoxysilane, 3-mercaptopropyl trimethoxysilane, bis(triethoxysilylpropyl) tetrasulfide, and 3-isocyanatopropyl triethoxysilane. When polyamide-imide is employed as the binder resin, it is preferable to employ, as the silane coupling agent, 2-(3,4-epoxycyclohexyl)ethyl trimethoxysilane, 3-triethoxysilyl-N-(1,3-dimethyl-butylidene)propylamine, N-phenyl-3-aminopropyl trimethoxysilane, 3-ureidopropyl triethoxysilane and/or 3-isocyanatopropyl triethoxysilane. It is particularly preferable to employ 2-(3,4-epoxycyclohexyl) ethyl trimethoxysilane, which has an epoxy group as a functional group, 3-glycidoxypropyl trimethoxysilane, 3-glycidoxypropyl methyldiethoxysilane, and 3-glycidoxypropyl triethoxysilane. These four agents are also excellent in storage stability.

Figure 3:
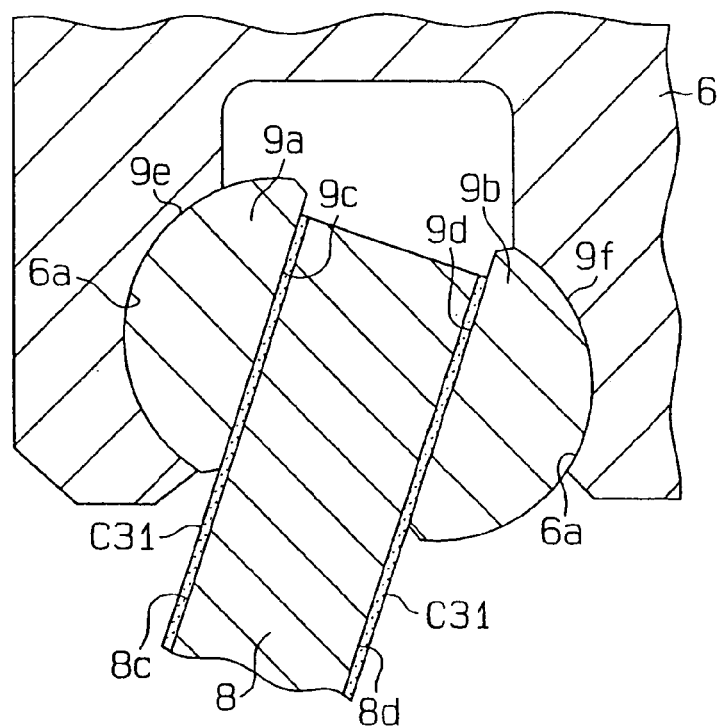
FIG. 3 is a cross-sectional view including sliding surfaces between shoes and a swash plate provided in the compressor in FIG. 1.

In this embodiment, as shown in FIG. 3, the swash plate 8 is selected as the first member, and the shoes 9a and 9b are selected as the second members. Specifically, sliding films C31 shown in below described Table 3 are applied to a front surface 8c and a rear surface 8d (first sliding surfaces) of the swash plate 8 on which flat surfaces 9c and 9d (second sliding surfaces) of the shoes 9a and 9b slide. The sliding films C31 are formed as follows.

First, the following ingredients are prepared.

Solid lubricant: PTFE powder (average primary particle diameter 0.3 μm)

Inorganic particles: rutile titanium oxide powder (average primary particle diameter 0.3 μm)

Silane coupling agent: 2-(3,4-epoxycyclohexyl)ethyl trimethoxysilane,

Binder resin: polyamide-imide (PAI) resin varnish (PAI resin 30% by mass, solvent (n-methyl-2-pyrrolidone 56% by mass, xylene 14% by mass) 70% by mass)

20% by mass solid lubricant, 10% by mass inorganic particles, 5% by mass silane coupling agent, and 65% by mass uncured binder resin are blended, fully stirred, and passed through a triple roll mill to prepare coating composition for use in sliding parts.

Next, a degreased swash plate 8 made of an iron-base alloy is prepared, and the coating composition for use in sliding parts is coated on a front surface 8c and a rear surface 8d on an outer periphery of the swash plate 8. At this time, the coating composition for use in sliding parts is coated on the swash plate 8 by roll coat transferring, and the swash plate 8 is heated at 200° C. for 60 minutes under the atmospheric conditions to cure the uncured binder resin. Thus, the sliding film C31 formed of binder resin which contains a solid lubricant, inorganic particles, and a silane coupling agent is formed on the front surface 8c and the rear surface 8d on the outer periphery of the swash plate 8. The solid lubricant and the inorganic particles are dispersed in the binder resin to form the sliding films C31. The obtained swash plate 8 is used to assemble the compressor. The coating composition for use in sliding parts may also be coated on the surfaces 8c and 8d of the swash plate 8 by air spraying.

A pulley or an electromagnetic clutch is connected to the drive shaft 5 of the compressor, and the compressor is mounted to a vehicle. The pulley or the electromagnetic clutch is driven by an engine via a belt. Rotation of the drive shaft 5 by the engine causes the swash plate 8 to wobble, and causes each piston 6 to reciprocate within the corresponding cylinder bore 1a with a stroke depending on inclination angles of the swash plate 8. The rotation of the drive shaft 5 causes the rotary valve 12 to rotate, and the introduction chamber 12a selectively communicates with or shut off the corresponding compression chamber 11 in synchronization with each piston 6 via the suction guide groove 12b and the corresponding suction passage 1c. Thus, when each piston 6 moves to the bottom dead center, the rotary valve 12 provides communication between the introduction chamber 12a and the compression chamber 11, and a refrigerant gas in the evaporator is drawn into the compression chamber 11 via the suction chamber 4a and the introduction chamber 12a. On the other hand, as each piston 6 moves to the top dead center, the rotary valve 12 blocks communication between the introduction chamber 12a and the compression chamber 11, and the refrigerant gas is compressed in the compression chamber 11 and then discharged to the condenser via the discharge chamber 4b.

During the operation of the compressor., the solid lubricant contained in the sliding films C31 applied to the surfaces 8c and 8d of the swash plate 8 secure seizure resistance between the swash plate 8 and the shoes 9a and 9b like a conventional compressor. It is considered that the inorganic particles contained in the sliding film C31 support a load acting between the swash plate 8 and the shoes 9a and 9b. Further, it is considered that the silane coupling agent contained in the sliding film C31 serves to bind the solid lubricant and the inorganic particles firmly to the binder resin. This prevents the solid lubricant from dropping out of the film, resulting in reduced wear depth of the sliding film C31 and reduced rattles of the compressor.

Therefore, even under severe conditions such that the swash plate 8 and the shoes 9a and 9b slide upon each other at high speed or on a relatively heavy load, the sliding films C31 on the surfaces 8c and 8d of the swash plate 8 allow the flat surfaces 9c and 9d of the shoes 9a and 9b to slide smoothly.

This prevents rattles of the swash plate 8 and the shoes 9a and 9b by wear of at least one of them or failures resulting from seizure therebetween more effectively than the conventional compressor.

Instead of the sliding films C31, any of other sliding films C2 to C19, C29, C30, C32 to C36 shown in below described Tables 1 to 4 may be formed on the surfaces 8c and 8d of the swash plate 8.

Without forming the sliding films C31 on the surfaces 8c and 8d of the swash plate 8, similar sliding films may be formed on the flat surfaces 9c and 9d of the shoes 9a and 9b only. Also, similar sliding films may be formed on the surfaces 8c and 8d of the swash plate 8 and the flat surfaces 9c and 9d of the shoes 9a and 9b.

Figure 4:
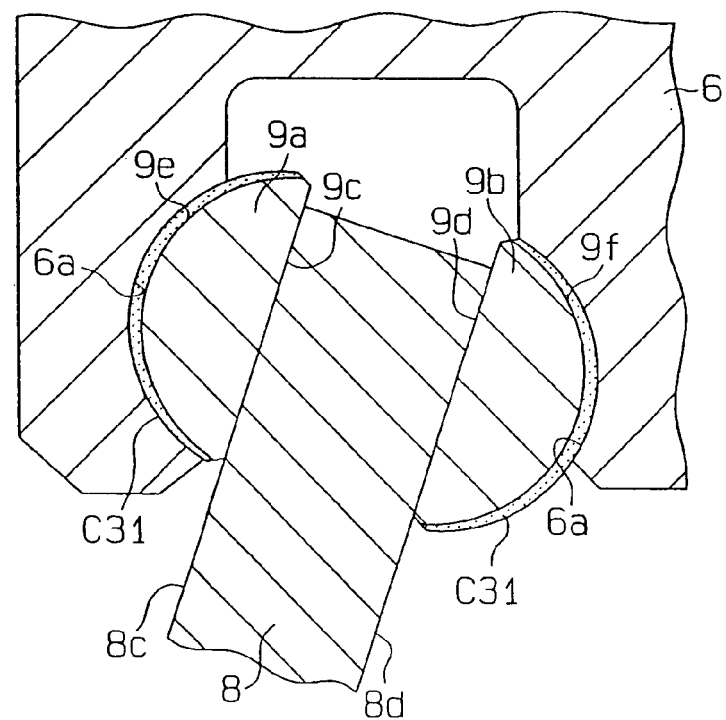
FIG. 4 is a cross-sectional view including sliding surfaces between shoes and a piston in a modified embodiment of the compressor in FIG. 1.

Further, as a modified embodiment shown in FIG. 4, the shoes 9a and 9b may be selected as a first member, and the piston 6 may be selected as second members. Specifically, similar sliding films C31 may be formed on at least one of convex spherical surfaces 9e and 9f of the shoes 9a and 9b as first sliding surfaces and concave spherical surfaces 6a of the piston 6 as second sliding surfaces. In this case, the sliding films C31 allow each other to slide smoothly, thus preventing rattles of the shoes 9a and 9b and the piston 6 by wear of at least one of them or failures resulting from seizure therebetween more effectively than the conventional compressor. Also, the convex spherical surfaces 9e and 9f of the shoes 9a and 9b slide smoothly upon the concave spherical surfaces 6a of the piston 6, and the flat surfaces 9c and 9d of the shoes 9a and 9b readily follow the surfaces 8c and 8d of the swash plate 8, thus preventing rattles of the swash plate 8 and the shoes 9a and 9b by wear of at least one of them or failures resulting from seizure therebetween more effectively than the conventional compressor.

Figure 5:
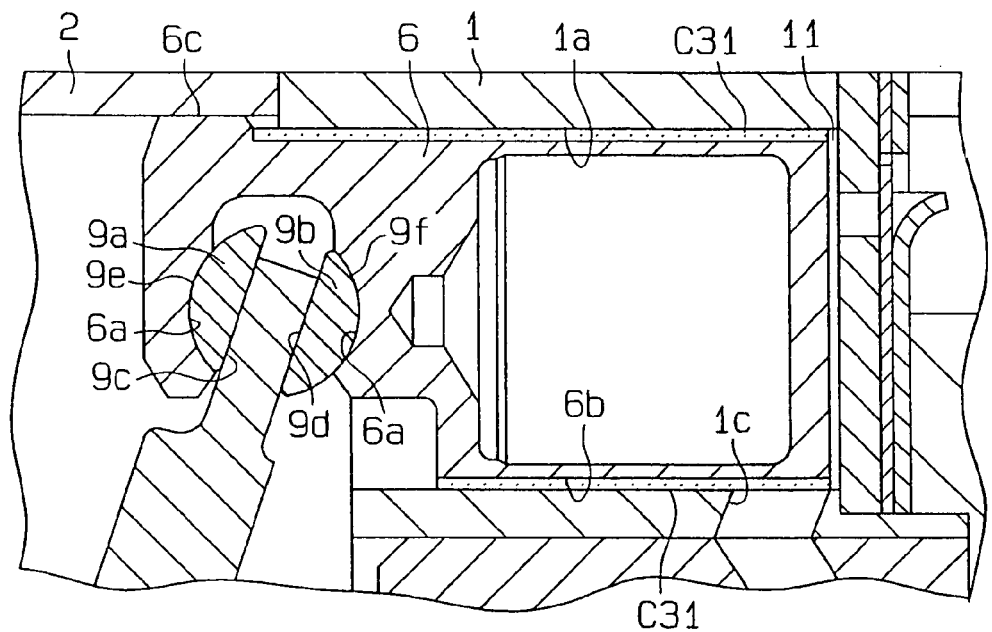
FIG. 5 is a cross-sectional view including a sliding surface between a piston and a housing in a modified embodiment of the compressor in FIG. 1.

As a modified embodiment shown in FIG. 5, the piston 6 may be selected as a first member, and the cylinder block 1 that is a part of the housing may be selected as a second member. Specifically, a similar sliding film C31 may be formed on at least one of a circumferential surface 6b of the piston 6 as a first sliding surface, and an inner circumferential surface of the cylinder bore 1a of the cylinder block 1 as a second sliding surface. In this case, the sliding film C31 allows each other to smoothly slide, thus preventing rattles of the piston 6 and the cylinder block 1 by wear of at least one of them or failures resulting from seizure therebetween more effectively than the conventional compressor.

Figure 6:
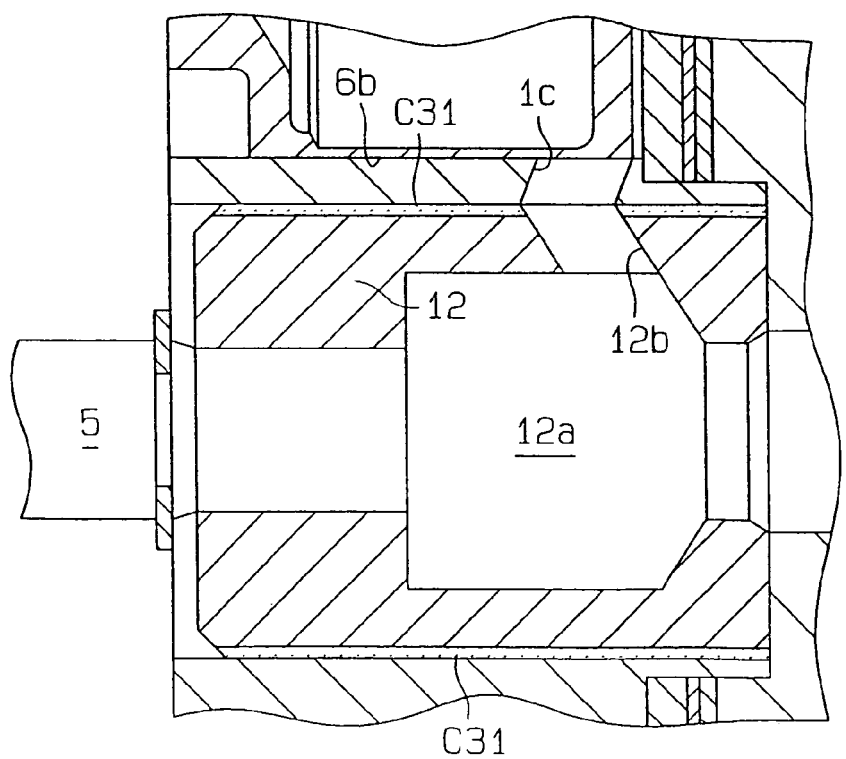
FIG. 6 is a cross-sectional view including a sliding surface between a rotary valve and a housing in a modified embodiment of the compressor in FIG. 1.

As a modified embodiment shown in FIG. 6, the cylinder block 1, which is part of the housing, may be selected as a first member, and the rotary valve 12 may be selected as a second member. Specifically, a similar sliding film C31 may be formed on at least one of an inner circumferential surface of the rotary valve chamber 1b of the cylinder block 1 as a first sliding surface, and an outer circumferential surface of the rotary valve 12 as a second sliding surface. In this case, the sliding film C31 allows each other to smoothly slide, thus preventing rattles of the cylinder block 1 and the rotary valve 12 by wear of at least one of them or failures resulting from seizure therebetween more effectively than the conventional compressor.

For the compressor in FIG. 6, a similar sliding film may be applied to at least one of an inner circumferential surface of a shaft hole of the front housing member 2 and an outer circumferential surface of the drive shaft 5 to slidably and rotatably support the drive shaft 5 by the front housing member 2, without using the radial bearing 2b. Further, a similar sliding film may be applied to at least one of an inner end surface of the front housing member 2 and a front end surface of the lug plate 7 to slidably and rotatably support the lug plate 7 by the front housing member 2, without using a thrust bearing 2c. A similar sliding film may be applied to at least one of an inner circumferential surface of the through hole 8a of the swash plate 8 and the outer circumferential surface of the drive shaft 5 to allow the swash plate 8 and the drive shaft 5 to smoothly slide upon each other. Further, a similar sliding film may be applied to at least one of an the inner circumferential surface of each guide hole 7b of the lug plate 7 and the outer surface of the spherical part of each guide pin 8b of the swash plate 8 to allow the spherical part of the guide pin 8b to smoothly slide in the guide hole 7b. A similar sliding film may be applied to at least one of a rear end surface 12c of the rotary valve 12 and a front end surface 4c of the rear housing member 4, which is part of the housing and slides upon the rear end surface 12c, to allow the rear end surface 12c of the rotary valve 12 to smoothly slide upon the front end surface 4c of the rear housing member 4, that is, the housing.

Figure 7:
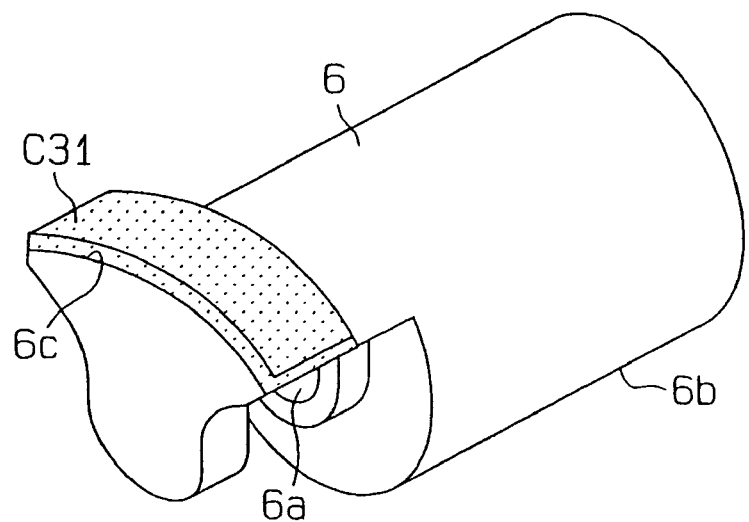
FIG. 7 is a perspective view of a piston in a modified embodiment of the compressor in FIG. 1.
Figure 8:
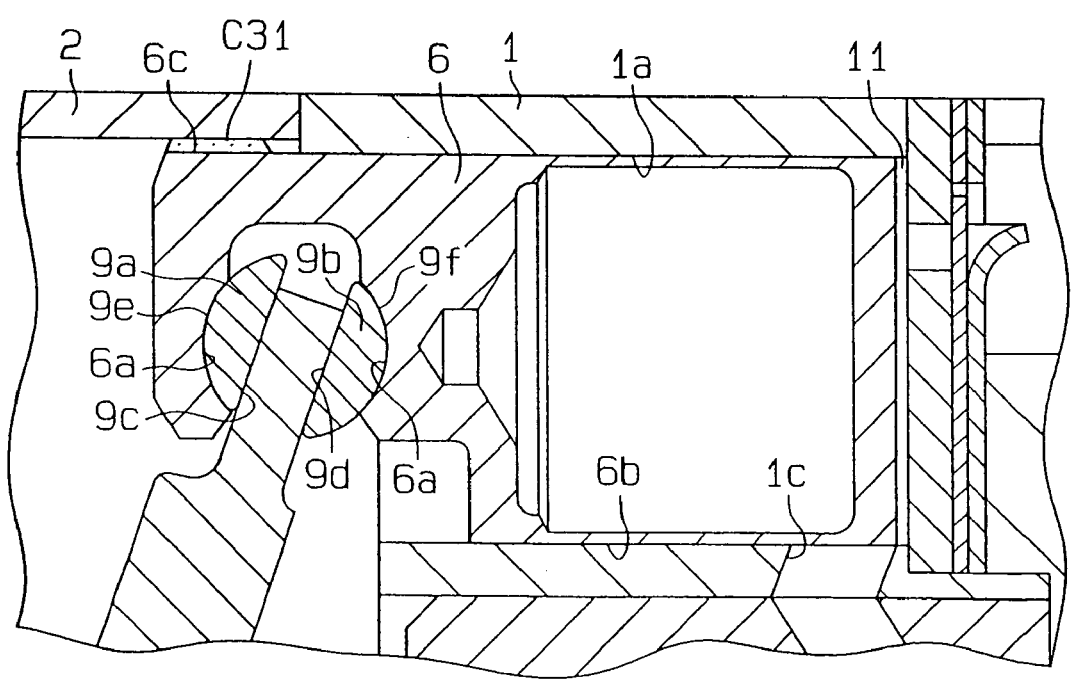
FIG. 8 is a cross-sectional view including a sliding surface between a rotation restrictor of a piston and a housing in a modified embodiment of the compressor in FIG. 1.

As a modified embodiment shown in FIGS. 7 and 8, the piston 6 may be selected as a first member, and the front housing member 2 that is a part of the housing may be selected as a second member. The piston 6 has a rotation restrictor 6c (a first sliding surface) that prevents rotation of the piston 6 caused by the rotation of the swash plate 8. The rotation restrictor 6c slides upon an inner circumferential surface (a second sliding surface) of the front housing member 2 by reciprocation of the piston 6, and a similar sliding film C31 may be applied to at least one of the rotation restrictor 6c of the piston 6 and the inner circumferential surface of the front housing member 2 to allow the rotation restrictor 6c of the piston 6 to smoothly slide upon the inner circumferential surface of the front housing member 2, that is, the housing.

Next, a second embodiment of the invention will be described with reference to FIGS. 9 to 12.

Figure 9:
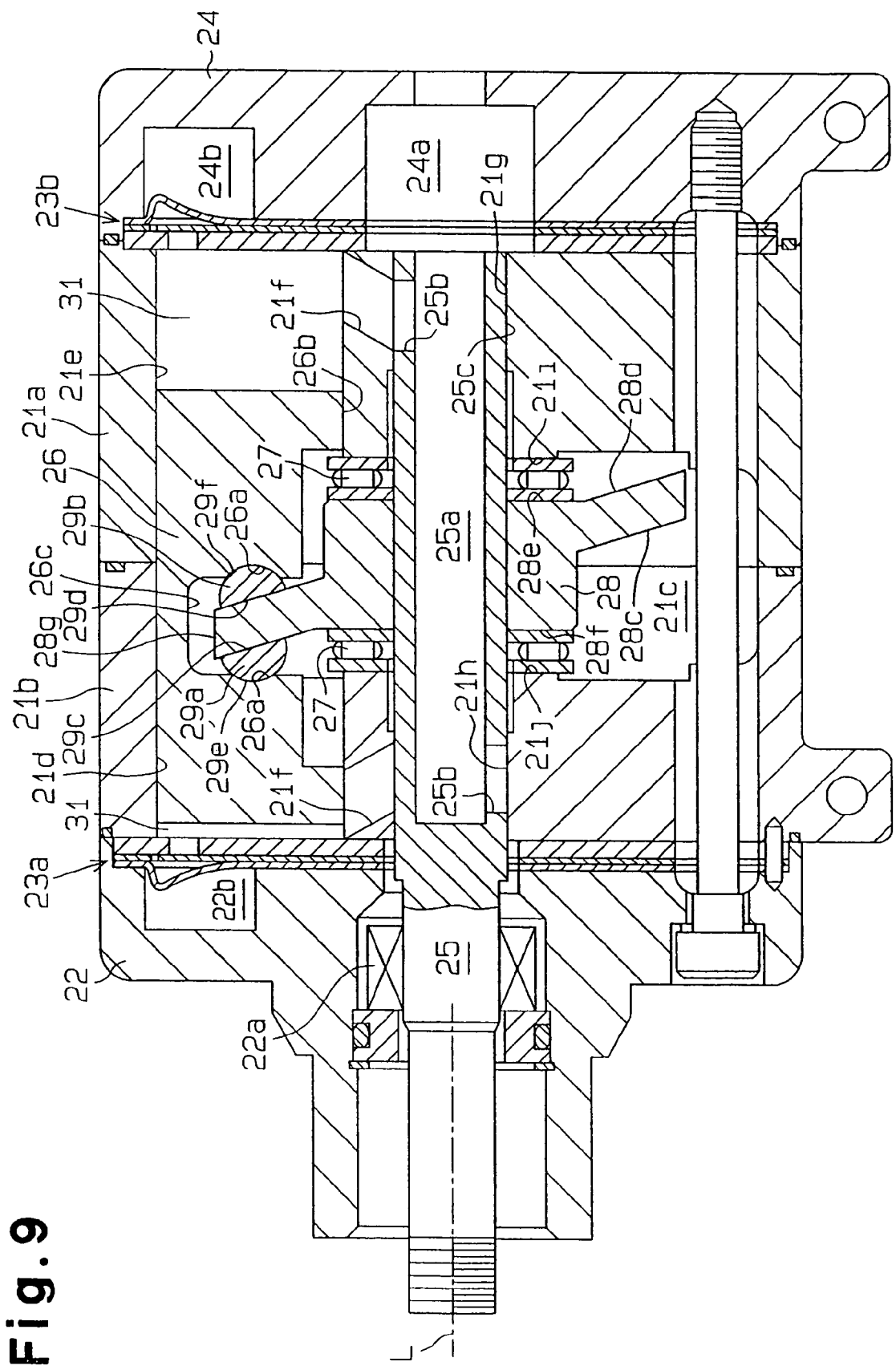
FIG. 9 is a cross-sectional view of a compressor according to a second embodiment of the invention.

As shown in FIG. 9, a fixed displacement swash plate type compressor includes a pair of cylinder block members 21a and 21b made of an aluminum-based alloy, a front housing member 22 made of an aluminum-based alloy and secured to a front end of the cylinder block member 21a with a valve mechanism 23a including a valve plate, a discharge valve, and a retainer, and a rear housing member 24 made of an aluminum-based alloy and secured to a rear end of the cylinder block member 21b with a valve mechanism 23b including a valve plate, a discharge valve, and a retainer. A discharge chamber 22b is defined in the front housing member 22. A suction chamber 24a and a discharge chamber 24b are formed in the rear housing member 24. In this embodiment, the cylinder block members 21a and 21b, the front housing member 22, and the rear housing member 24 constitute the housing. The discharge chambers 22b and 24b communicate with a single discharge chamber (not show). The suction chamber 24a is connected to an evaporator (not show), the evaporator is connected to a condenser (not show) via an expansion valve (not show), and the condenser is connected to the discharge chamber.

In the cylinder block members 21a and 21b, a drive shaft 25 made of an iron-base alloy is slidably and rotatably supported. A seal member 22a is provided between the drive shaft 25 and the front housing member 22. A plurality of cylinder bores 21d and 21e (only one of each is shown in FIG. 9) extending in parallel with an axis L of the drive shaft 25 pass through the cylinder block members 21a and 21b. Each pair of cylinder bores 21d and 21e accommodate a double-headed piston 26 made of an aluminum-based alloy to permit the piston 26 to reciprocate. In each pair of the cylinder bores 21d and 21e, compression chambers 31 are defined. The compression chambers 31 are changed in volume depending on reciprocation of the piston 26.

The drive shaft 25 has an introduction chamber 25a communicating with the suction chambers 24a. Suction guide grooves 25b radially pass through a front end and a rear end of the introduction chamber 25a. Suction passages 21f that provide communication between each of the cylinder bores 21d and 21e and the introduction chamber 25a via the suction guide grooves 25b passe through each of the cylinder block members 21a and 21b.

A swash plate chamber 21c is defined between the cylinder block members 21a and 21b. In the swash plate chamber 21c, a swash plate 28 made of an aluminum-based alloy is secured to the drive shaft 25. Pairs of hemispherical shoes 29a, 29b made of an aluminum-based alloy are provided on an outer periphery of the swash plate 28. Each piston 26 is engaged with the outer periphery of the swash plate 28 via the shoes 29a and 29b. Thrust bearings 27 are provided between opposite end surfaces of the swash plate 28 and inner surfaces of corresponding cylinder block members 21a and 21b. The swash plate 28 is held between the cylinder block members 21a and 21b via the pair of thrust bearings 27.

Figure 10:
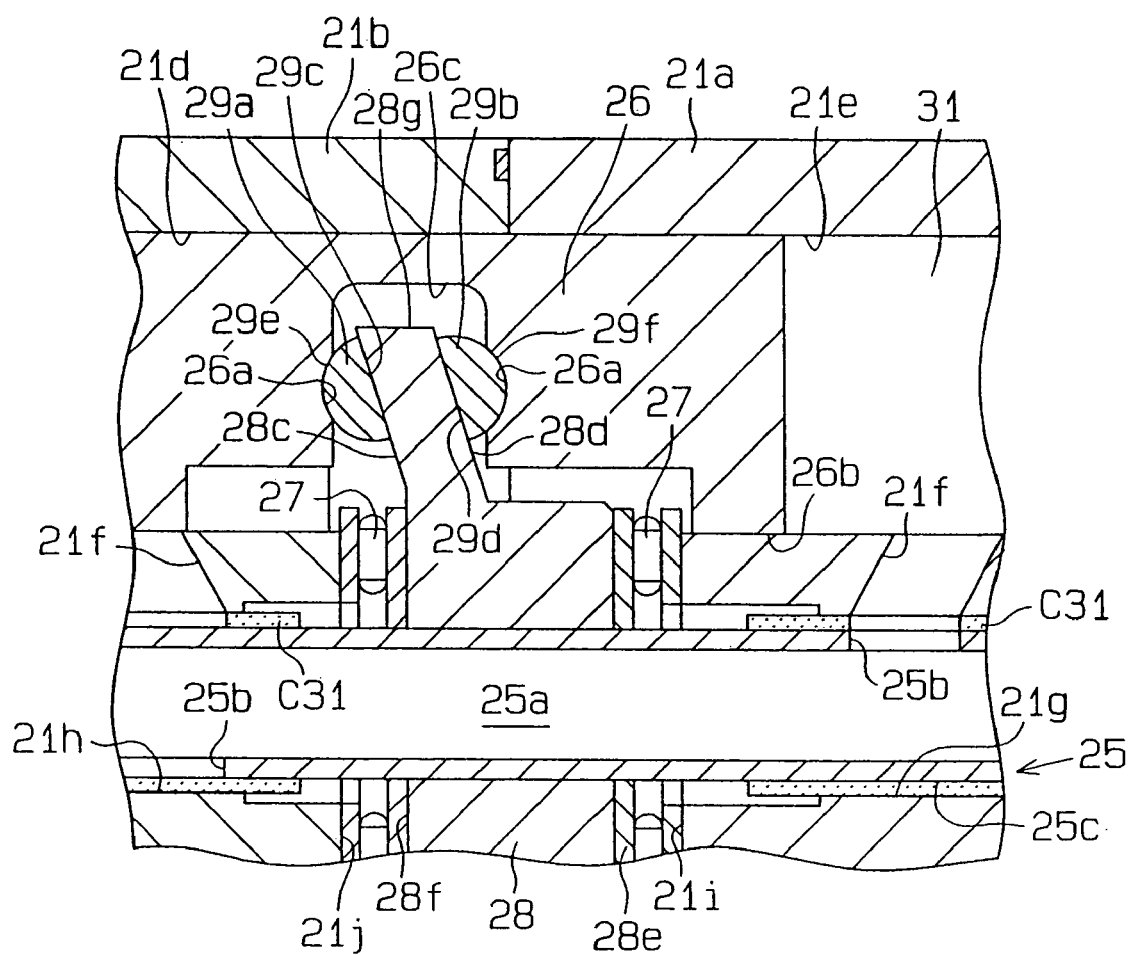
FIG. 10 is a cross-sectional view including a sliding surface between a drive shaft and a housing provided in the compressor in FIG. 9.

In this embodiment, the cylinder block members 21a and 21b, which are part of the housing, are selected as a first member, and the drive shaft 25 is selected as a second member. Specifically, as shown in FIG. 10, sliding films C31 shown in Table 3 is applied to an outer circumferential surface 25c (a second sliding surface) of the drive shaft 25 on which inner circumferential surfaces 21h and 21g (a first sliding surface) of the cylinder block members 21a and 21b slide. The sliding films C31 are formed as follows.

First, like the embodiment in FIGS. 1 to 8, a coating composition for use in sliding parts and the drive shaft 25 are prepared, and the coating composition for use in sliding parts is coated on the outer circumferential surface 25c of the drive shaft 25. At this time, the coating composition for use in sliding parts is coated on the drive shaft 25 by roll coat transferring, and the drive shaft 25 is heated at 200° C. for 60 minutes under the atmospheric conditions to cure uncured binder resin. Thus, the sliding films C31 formed of binder resin which contains a solid lubricant, inorganic particles, and a silane coupling agent are applied to the outer circumferential surface 25c of the drive shaft 25. The solid lubricant and the inorganic particles are dispersed in the binder resin to form the sliding films C31. The obtained drive shaft 25 is used to assemble the compressor.

A pulley or electromagnetic clutch (neither is shown) is connected to the drive shaft 25 of the compressor thus configured, and the compressor is mounted to a vehicle (not show). The pulley or the electromagnetic clutch is driven by an engine via a belt (not show). Rotation of the drive shaft 25 while the engine is driven causes the swash plate 28 to wobble, and causes the pistons 26 to reciprocate within the cylinder bores 21d and 21e with a stroke depending on inclination angles of the swash plate 28. The rotation of the drive shaft 25 causes the introduction chamber 25a to selectively communicate with or shut off the compression chambers 31 via the suction guide groove 25b and the suction passages 21f. For example, when each piston 26 moves from the right to the left in FIG. 9, the introduction chamber 25a communicates with the compression chamber 31 on the right. As a result, a refrigerant gas in the evaporator in a refrigeration circuit is drawn into the compression chamber 31 on the right via the suction chamber 24a and the introduction chamber 25a. At this time, communication between the compression chamber 31 on the left and the introduction chamber 25a is blocked, and the refrigerant gas is compressed in the compression chamber 31 on the left and then discharged to the condenser via the discharge chamber 24b. On the other hand, when each piston 26 moves from the left to the right in FIG. 9, the compression chamber 31 operates in an opposite manner.

During the operation of the compressor, the solid lubricant contained in the sliding film C31 applied to the outer circumferential surface 25c of the drive shaft 25 secures seizure resistance between the drive shaft 25 and the inner circumferential surfaces 21g and 21h of the cylinder block members 21a and 21b. It is considered that the inorganic particles contained in the sliding film C31 support a load acting between the drive shaft 25 and the inner circumferential surfaces 21g and 21h of the cylinder block members 21a and 21b. Further, it is considered that the silane coupling agent contained in the sliding film C31 serves to bind the solid lubricant and the inorganic particles firmly to the binder resin. This prevents the solid lubricant from dropping out of the film, resulting in reduced wear depth of the sliding film C31 and reduced rattles of the compressor.

Therefore, even under severe conditions such that the drive shaft 25 and the cylinder block members 21a and 21b slide upon each other at high speed or on a relatively heavy load, the sliding films C31 allow the outer circumferential surface 25c of the drive shaft 25 to smoothly slide. This prevents rattles of the drive shaft 25 and the cylinder block members 21a and 21b by wear of at least one of them or failures resulting from seizure therebetween more effectively than the conventional compressor.

Instead of the sliding film C31, any of sliding films C2 to C19, C29, C30, C32 to C36 shown in below described Tables 1 to 4 may be formed on the outer circumferential surface 25c of the drive shaft 25.

Without forming the sliding films C31 on the outer circumferential surface 25c of the drive shaft 25, a similar sliding films may be formed only on the inner circumferential surfaces 21g and 21h of the cylinder block members 21a and 21b. Also, a similar sliding films may be formed on the outer circumferential surface 25c of the drive shaft 25 and the inner circumferential surfaces 21g and 21h of the cylinder block members 21a and 21b.

As a modification of this embodiment, the swash plate 28 may be selected as a first member, and the shoes 29a and 29b may be selected as a second member. Specifically, a similar sliding film may be formed on at least one of surfaces 28c and 28d (a first sliding surface) of the swash plate 28 and flat surfaces 29c and 29d (a second sliding surface) of the shoes 29a and 29b. In this case, the sliding film allows each other to smoothly slide, thus preventing rattles of the swash plate 28 and the shoes 29a and 29b by wear of at least one of them or failures resulting from seizure therebetween more effectively than the conventional compressor.

Further, as a modification of this embodiment, the shoes 29a and 29b may be selected as first members, and the pistons 26 may be selected as second members. Specifically, similar sliding film may be formed on at least one of convex spherical surfaces 29e and 29f (a first sliding surface) of the shoes 29a and 29b and concave spherical surfaces 26a (a second sliding surface) of the pistons 26. In this case, the sliding films allow each other to smoothly slide, thus preventing rattles of the shoes 29a and 29b and the piston 26 by wear of at least one of them or failures resulting from seizure therebetween more effectively than the conventional compressor. The convex spherical surfaces 29e and 29f of the shoes 29a and 29b smoothly slide upon the concave spherical surfaces 26a of the piston 26, and the flat surfaces 29c and 29d of the shoes 29a and 29b smoothly follows the surfaces 28c and 28d of the swash plate 28, thus preventing rattles of the swash plate 28 and the shoes 29a and 29b by wear of at least one of them or failures resulting from seizure therebetween more effectively than the conventional compressor.

As a modification of this embodiment, the pistons 26 may be selected as first members, and the cylinder block members 21a and 21b may be selected as second members. Specifically, similar sliding films may be formed on at least one of a circumferential surface 26b (a first sliding surface) of the piston 26, and inner circumferential surfaces (a second sliding surface) of the cylinder bores 21e and 21d of the cylinder block members 21a and 21b. In this case, the sliding films allow each other to smoothly slide, thus preventing rattles of the piston 26 and the cylinder block members 21a and 21b by wear of at least one of them or failures resulting from seizure therebetween more effectively than the conventional compressor.

Similar sliding films may be applied to at least one of opposite end surfaces 28e and 28f of the swash plate 28 and wall surfaces 21i and 21j forming the swash plate chamber 21c of the cylinder block members 21a and 21b, without using the thrust bearing 27. This configuration allows the swash plate 28 to be slidably and rotatably held between the cylinder block members 21a and 21b.

Figure 11:
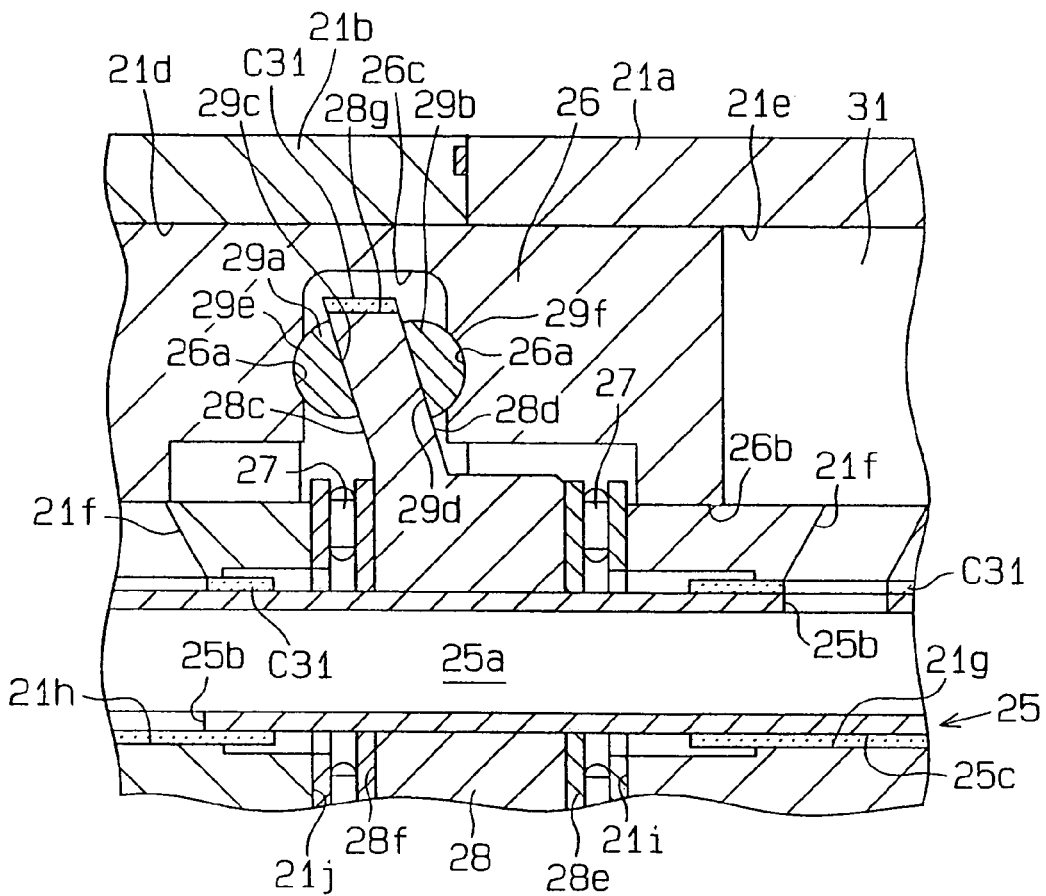
FIG. 11 is a cross-sectional view including a sliding surface between a piston and a swash plate provided in the compressor in FIG. 9.
Figure 12:
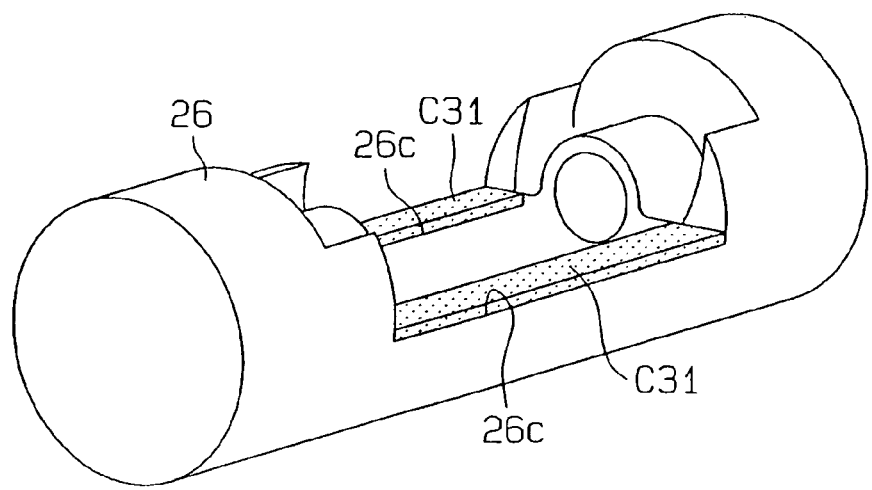
FIG. 12 is a perspective view of the piston provided in the compressor in FIG. 9.

Further, as a modified embodiment shown in FIGS. 11 and 12, the pistons 26 may be selected as first members, and the swash plate 28 may be selected as a second member. Specifically, similar sliding films may be formed on at least one of a rotation restrictor 26c (a first sliding surface) of the piston 26, and an outer circumferential surface 28g (a second sliding surface) of the swash plate 28. In this case, the sliding films allow each other to smoothly slide, thus preventing rattles of the rotation restrictor 26c of the piston 26 and the outer circumferential surface 28g of the swash plate 28 by wear of at least one of them or failures resulting from seizure therebetween more effectively than the conventional compressor.

In order to confirm the advantages of the invention, the following tests were conducted.

First, the following ingredients were prepared.

Solid lubricant: PTFE powder (average primary particle diameter 0.3 μm), molybdenum disulfide (average primary particle diameter 1 μm), graphite (average primary particle diameter 5 μm)

Inorganic particles: rutile titanium oxide powder (average primary particle diameter 0.3 μm), silicon carbide powder (average primary particle diameter 0.3 μm), silica powder (average primary particle diameter 0.3 μm)

Silane coupling agent: 2-(3,4-epoxycyclohexyl)ethyl trimethoxysilane, 3-glycidoxypropyl trimethoxysilane, 3-glycidoxypropyl methyldiethoxysilane, 3-glycidoxypropyl triethoxysilane, 3-triethoxysilyl-N-(1,3-dimethyl-butylidene) propylamine, N-phenyl-3-aminopropyl trimethoxysilane, 3-ureidopropyl triethoxysilane, 3-isocyanatopropyl triethoxysilane Binder resin: polyamide-imide (PAI) resin varnish (PAI resin 30% by mass, solvent (n-methyl-2-pyrrolidone 56% by mass, xylene 14% by mass) 70% by mass)

PAI resin varnish was blended with a solid lubricant (PTFE, MoS2, etc.), titanium oxide powder and a coupling agent, fully stirred and passed through a triple roll mill to prepare a coating composition for use in sliding parts. The coating composition for use in sliding parts was optionally diluted with n-methyl-2-pyrrolidone or xylene, as a solvent, or the mixed solvent thereof depending on the types of coating methods employed (spray coating, roll coating, etc.) for the purpose of adjustment of viscosity, solid material concentration, etc. The coating composition for use in sliding parts may also be prepared in such a manner as to first blend a solid lubricant and titanium oxide powder with a coupling agent to prepare a treated powder and then mix the treated powder with PAI resin varnish. Thus, the solid lubricant and the titanium oxide powder are readily dispersed in the PAI resin varnish, hard to maldistribute in a sliding film formed of the coating composition for use in sliding parts and bound securely to the binder resin via the coupling agent.

Figure 13:
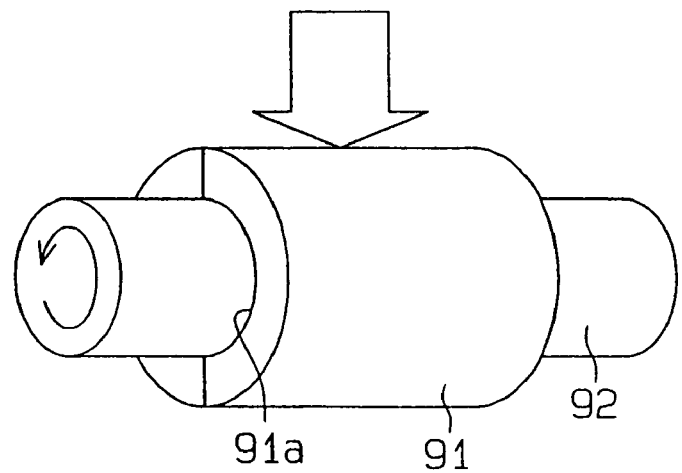
FIG. 13 is a perspective view of a journal bearing tester.

Then, degreased ingot of aluminum alloy A390 was prepared and a plurality of substrates 91, as first members, with its section perpendicular to the axis having C-like shape and its length 20 mm were formed as shown in FIG. 13. Of the substrates, two were selected and combined so that they faced each other to form a bush 20 mm in inside diameter. Coating compositions for use in sliding parts having been prepared so that sliding films C1 to C37 had the respective compositions shown in Table 1 to Table 4 were coated on the inside surface 1a of the respective substrates 91 by air spraying to form coating films 25 μm thick. Table 1 to Table 4 also show the amount % by mass of each solid lubricant, inorganic particles or silane coupling agent per 100 mass % of PAI resin. Coating can also be carried out by roll coat transferring, instead of air spraying. The substrates 91 each having a coating formed on their inside surface were heated at 200° C. for 60 minutes under the atmospheric conditions to cure the PAI resin. Thus sliding films C1 to C37 were applied onto the respective substrates 91.

TABLE 1

| (mass %) | | C1 | C2 | C3 | C4 | C5 | C6 | C7 | C8 | C9 | C10 |
|---|---|---|---|---|---|---|---|---|---|---|---|
| PAI resin (as an active ingredient) | | 65 | 65 | 65 | 65 | 65 | 65 | 65 | 65 | 65 | 65 |
| Solid lubricant | PTFE powder | 35 | 30 | 25 | 15 | 34 | 33 | 32 | 28 | 23 | 13 |
| | molybdenum disulfide | — | — | — | — | — | — | — | — | — | — |
| | graphite | — | — | — | — | — | — | — | — | — | — |
| mass % of solid lubricant per 100 mass % of PAI resin | | 53.8 | 46.2 | 38.5 | 23.1 | 52.3 | 50.1 | 49.2 | 43.1 | 35.4 | 20.0 |
| Inorganic particle | titanium oxide powder | — | 5 | 10 | 20 | — | — | — | 5 | 10 | 20 |
| | silicon carbide powder | — | — | — | — | — | — | — | — | — | — |
| | silica powder | — | — | — | — | — | — | — | — | — | — |
| mass % of inorganic particle per 100 mass % of PAI resin | | 0 | 7.7 | 15.4 | 30.8 | 0 | 0 | 0 | 7.7 | 15.4 | 30.8 |
| Silane coupling agent | 2-(3,4-epoxycyclohexyl)ethyl trimethoxysilane | — | — | — | — | 1 | 2 | 3 | 2 | 2 | 2 |
| | 3-triethoxysilyl-N-(1,3-dimethyl-butylidene)propylamine | — | — | — | — | — | — | — | — | — | — |

TABLE 1-continued

| (mass %) | C1 | C2 | C3 | C4 | C5 | C6 | C7 | C8 | C9 | C10 |
|---|---|---|---|---|---|---|---|---|---|---|
| N-phenyl-3-aminopropyl trimethoxysilane | — | — | — | — | — | — | — | — | — | — |
| 3-ureidopropyl triethoxysilane | — | — | — | — | — | — | — | — | — | — |
| 3-isocyanatopropyl triethoxysilane | — | — | — | — | — | — | — | — | — | — |
| mass % of silane coupling agent per 100 mass % of PAI resin | 0 | 0 | 0 | 0 | 1.5 | 3.1 | 4.6 | 3.1 | 3.1 | 3.1 |

TABLE 2

| | (mass %) | C11 | C12 | C13 | C14 | C15 | C16 | C17 | C18 | C19 | C20 |
|---|---|---|---|---|---|---|---|---|---|---|---|
| | PAI resin (as an active ingredient) | 65 | 65 | 65 | 58 | 50 | 65 | 65 | 65 | 65 | 65 |
| Solid lubricant | PTFE powder | 24 | 23 | 22 | 30 | 38 | 23 | 23 | 23 | 23 | — |
| | molybdenum disulfide | — | — | — | — | — | — | — | — | — | 25 |
| | graphite | — | — | — | — | — | — | — | — | — | 10 |
| | mass % of solid lubricant per 100 mass % of PAI resin | 36.9 | 35.4 | 33.8 | 51.7 | 76.0 | 35.4 | 35.4 | 35.4 | 35.4 | 53.8 |
| Inorganic particle | titanium oxide powder | 10 | 10 | 10 | 10 | 10 | 10 | 10 | 10 | 10 | — |
| | silicon carbide powder | — | — | — | — | — | — | — | — | — | — |
| | silica powder | — | — | — | — | — | — | — | — | — | — |
| | mass % of inorganic particle per 100 mass % of PAI resin | 15.4 | 15.4 | 15.4 | 17.2 | 20.0 | 15.4 | 15.4 | 15.4 | 15.4 | 0 |
| Silane coupling agent | 2-(3,4-epoxycyclohexyl)ethyl trimethoxysilane | 1 | 2 | 3 | 2 | 2 | — | — | — | — | — |
| | 3-triethoxysilyl-N-(1,3-dimethyl-butylidene)propylamine | — | — | — | — | — | 2 | — | — | — | — |
| | N-phenyl-3-aminopropyl trimethoxysilane | — | — | — | — | — | — | 2 | — | — | — |
| | 3-ureidopropyl triethoxysilane | — | — | — | — | — | — | — | 2 | — | — |
| | 3-isocyanatopropyl triethoxysilane | — | — | — | — | — | — | — | — | 2 | — |
| | mass % of silane coupling agent per 100 mass % of PAI resin | 1.5 | 3.1 | 4.6 | 3.4 | 4.0 | 3.1 | 3.1 | 3.1 | 3.1 | 0 |

TABLE 3

| | (mass %) | C21 | C22 | C23 | C24 | C25 | C26 | C27 | C28 | C29 | C30 |
|---|---|---|---|---|---|---|---|---|---|---|---|
| | PAI resin (as an active ingredient) | 95 | 90 | 80 | 70 | 50 | 80 | 80 | 70 | 70 | 75 |
| Solid lubricant | PTFE powder | — | — | — | — | — | — | — | — | 20 | 20 |
| | molybdenum disulfide | — | — | — | — | — | — | — | 20 | — | — |
| | graphite | — | — | — | — | — | — | — | 10 | — | — |
| | mass % of solid lubricant per 100 mass % of PAI resin | 0 | 0 | 0 | 0 | 0 | 0 | 0 | 42.9 | 28.9 | 26.7 |
| Inorganic particle | titanium oxide powder | 5 | 10 | 20 | 30 | 50 | — | — | — | 10 | — |
| | silicon carbide powder | — | — | — | — | — | 20 | — | — | — | — |
| | silica powder | — | — | — | — | — | — | 20 | — | — | — |
| | mass % of inorganic particle per 100 mass % of PAI resin | 5.3 | 11.1 | 25.0 | 42.9 | 100.0 | 25.0 | 25.0 | 0 | 14.3 | 0 |
| Silane coupling agent | 2-(3,4-epoxycyclohexyl)ethyl trimethoxysilane | — | — | — | — | — | — | — | — | — | 5 |
| | mass % of silane coupling agent per 100 mass % of PAI resin | 0 | 0 | 0 | 0 | 0 | 0 | 0 | 0 | 0 | 6.7 |

TABLE 4

| | (mass %) | C31 | C32 | C33 | C34 | C35 | C36 | C37 |
|---|---|---|---|---|---|---|---|---|
| | PAI resin (as an active ingredient) | 65 | 65 | 65 | 65 | 65 | 65 | 80 |
| Solid lubricant | PTFE powder | 20 | 24.9 | 21 | 23 | 23 | 23 | 20 |
| | molybdenum disulfide | — | — | — | — | — | — | — |
| | graphite | — | — | — | — | — | — | — |
| | mass % of solid lubricant per 100 mass % of PAI resin | 30.1 | 38.3 | 32.3 | 35.4 | 35.4 | 35.4 | 25.0 |

TABLE 4-continued

| (mass %) | | C31 | C32 | C33 | C34 | C35 | C36 | C37 |
|---|---|---|---|---|---|---|---|---|
| Inorganic particle | titanium oxide powder | 10 | 10 | 10 | 10 | 10 | 10 | — |
| | silicon carbide powder | — | — | — | — | — | — | — |
| | silica powder | — | — | — | — | — | — | — |
| mass % of inorganic particle per 100 mass % of PAI resin | | 15.4 | 15.4 | 15.4 | 15.4 | 15.4 | 15.4 | 0 |
| Silane coupling agent | 2-(3,4-epoxycyclohexyl)ethyltrimethoxysilane | 5 | 0.1 | 4 | — | — | — | — |
| | 3-glycidoxypropyltrimethoxysilane | — | — | — | 2 | — | — | — |
| | 3-glycidoxypropylmethyldiethoxysilane | — | — | — | — | 2 | — | — |
| | 3-glycidoxypropyltriethoxysilane | — | — | — | — | — | 2 | — |
| mass % of silane coupling agent per 100 mass % of PAI resin | | 7.7 | 0.2 | 6.2 | 3.1 | 3.1 | 3.1 | 0 |

Figure 14:
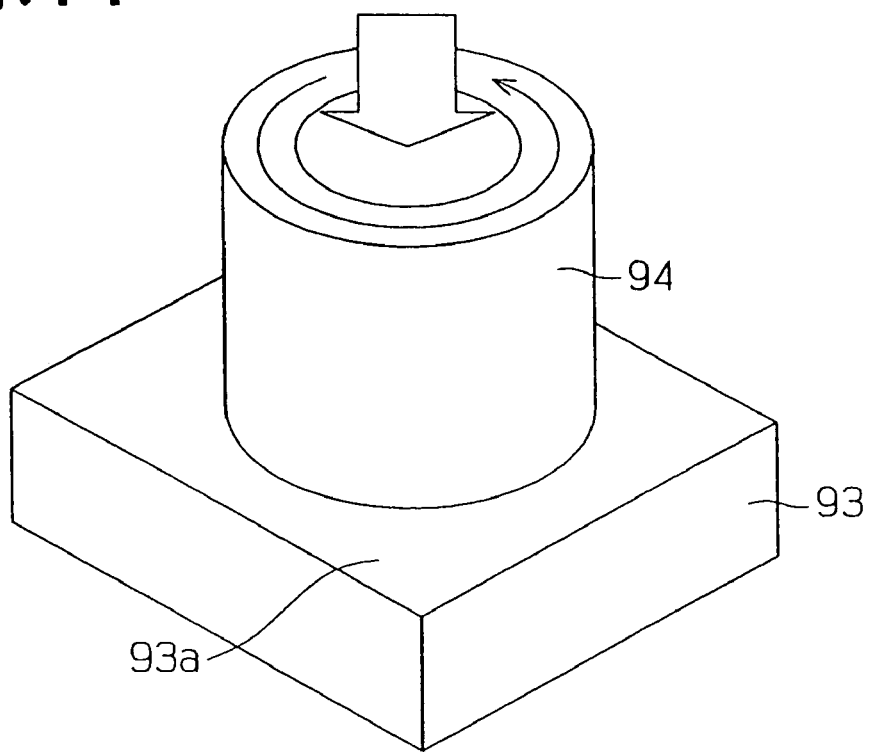
FIG. 14 is a perspective view of a thrust-type tester.

Further, a plurality of substrates 93, as first members, were prepared by cutting the above described ingot to 30 mm long, 30 mm wide and 5 mm thick, as shown in FIG. 14. The surfaces 93a of the substrates 93 were coated, by air spraying, with the respective coating compositions for use in sliding parts C1 to C37 that had been prepared to have the compositions shown in Table 1 to Table 4 to form coating films 25 μm thick. Coating can also be carried out by roll coat transferring, instead of air spraying. The substrates 93 each having a coating formed on their inside surface were heated at 200° C. for 60 minutes under the atmospheric conditions to cure the PAI resin. Thus sliding films C1 to C37 were applied onto the respective substrates 93.

The surface roughness (Rz) of each of the sliding films C21 to C28 was measured.

The wear depth (μm) was obtained with a journal bearing tester shown in FIG. 13. In the wear depth measurement with a journal bearing tester, first a shaft 92, as a second member, which was made up of carbon steel (S55C) and 20 mm in diameter was inserted into and passed through a bush consisting of a pair of substrates 91. And the measurement was carried out while setting a load from the bush at 1000 N, testing time at 1 hour and the number of revolutions of the shaft 92 against the bush at 5000 rpm (5.2 m/sec) and constantly supplying lubricating oil between the bush and the shaft 92.

Further, the seizure specific pressure (MPa) was obtained with a thrust-type tester shown in FIG. 14. In the seizure specific pressure measurement with a thrust-type tester, a cylindrical member 94, as a second member, which was made up of spring steel (SUJ2) was rotated on the surface 93a (a first sliding surface) of each substrate 93. The load at a time when seizure occurred between the surface 93a of each substrate 93 and the surface (a second sliding surface) of the cylindrical member 94 that was opposite to the surface 93a was obtained while rotating the cylindrical member 94 at a rotational speed to increase 1.2 m/sec on a fixed cycle (1 MPa/2 mins), that is, to increase the load applied from the cylindrical member 94 to the substrate 93. The kinetic coefficient of friction was also measured for each substrate 93 right after and 100 hours after starting the test under the conditions: a sliding speed of 1.2 m/sec and a specific pressure of 9.8 MPa. For the sliding films of C1 to C20 and C29 to C37, the kinetic coefficient of friction was not measured. The results are shown in Table 5 to Table 7.

TABLE 5

| | C1 | C2 | C3 | C4 | C5 | C6 | C7 | C8 | C9 | C10 |
|---|---|---|---|---|---|---|---|---|---|---|
| Wear depth (μm) | 24.0 | 22.1 | 16.5 | 15.5 | 21.8 | 14.6 | 15.2 | 9.5 | 6.8 | 7.7 |
| Seizure contact pressure (MPa) | 10 | 12 | 16 | 13 | 13 | 14 | 16 | 23 | 25 or more | 25 or more |

| | C11 | C12 | C13 | C14 | C15 | C16 | C17 | C18 | C19 | C20 |
|---|---|---|---|---|---|---|---|---|---|---|
| Wear depth (μm) | 7.8 | 5.9 | 6.5 | 5.8 | 6.2 | 7.2 | 6.9 | 8.1 | 7.2 | exposure of substrate |
| Seizure contact pressure (MPa) | 24 | 25 or more | 25 or more | 22 | 24 | 24 | 25 or more | 22 | 24 | 25 or more |

TABLE 6

| | | C21 | C22 | C23 | C24 | C25 | C26 | C27 | C28 | C29 | C30 |
|---|---|---|---|---|---|---|---|---|---|---|---|
| Surface roughness (Rz) | | 0.21 | 0.19 | 0.20 | 0.20 | 0.31 | 0.32 | 0.36 | 1.98 | — | — |
| Kinetic coefficient of friction | just after starting test | 0.024 | 0.023 | 0.021 | 0.023 | 0.027 | 0.031 | 0.038 | 0.052 | — | — |

TABLE 6-continued

|  | C21 | C22 | C23 | C24 | C25 | C26 | C27 | C28 | C29 | C30 |
|---|---|---|---|---|---|---|---|---|---|---|
| 100 hours after starting test | 0.021 | 0.018 | 0.017 | 0.020 | 0.025 | 0.027 | 0.032 | 0.048 | — | — |
| Wear depth (μm) | 4.0 | 3.1 | 2.8 | 2.6 | 5.2 | 5.1 | 6.3 | 19.0 | 4.5 | 4.3 |
| Seizure contact pressure (MPa) | 21 | 22 | 25 or more | 22 | 18 | 20 | 18 | 25 or more | 25 or more | 22 |

TABLE 7

|  | C31 | C32 | C33 | C34 | C35 | C36 | C37 |
|---|---|---|---|---|---|---|---|
| Surface roughness (Rz) | — | — | — | — | — | — | — |
| Kinetic coefficient of friction just after starting test | — | — | — | — | — | — | — |
| 100 hours after starting test | — | — | — | — | — | — | — |
| Wear depth (μm) | 2.1 | 7.5 | 6.6 | 5.7 | 6.2 | 6.3 | 10.3 |
| Seizure contact pressure (MPa) | 25 or more | 23 | 24 | 25 or more | 24 | 24 | 20 |

The data on the sliding films C1 to C4 and C20 shown in Table 5 and C37 shown in Table 7 indicate that when a sliding film is formed of a binder resin which contains a solid lubricant and in which part of the solid lubricant is replaced with titanium oxide powder, it has not satisfactorily improved wear resistance and seizure resistance. In addition, the data on the sliding films C1, C5 to C7, and C20 shown in Table 5 and C37 shown in Table 7 indicate that when a sliding film is formed of binder resin which contains solid lubricant and in which part of the solid lubricant is replaced with a silane coupling agent, it has not satisfactorily improved wear resistance and seizure resistance.

The data on the sliding films C1, C8 to C10, and C20 shown in Table 5 and C37 shown in Table 7 indicate that when a sliding film is formed of binder resin which contains solid lubricant, titanium oxide powder and a silane coupling agent, it particularly improves wear resistance and seizure resistance.

The data on the sliding films C11 to C19 shown in Table 5, C30 shown in Table 6, and C31 to C36 in Table 7 indicate that when a sliding film is formed of binder resin which contains solid lubricant, titanium oxide powder and a silane coupling agent, if the percentage of the silane coupling agent to the PAI resin is in the range between 0.1% by mass to 10% by mass, inclusive, centered at 3% by mass, it particularly improves wear resistance and seizure resistance. On the other hand, the data on the sliding films C14 and C15 shown in Table 5 indicate that even if the amount of the binder resin is decreased compared with that of the sliding films C12 and C13, as long as films contain titanium oxide powder and a silane coupling agent, their wear resistance is excellent and their seizure resistance does not significantly deteriorate.

The data on the sliding films C9 and C16 to C19 shown in Table 5 and C34 to C36 shown in Table 7 indicate that as long as the silane coupling agent is 2-(3,4-epoxycyclohexyl)ethyl trimethoxysilane, 3-triethoxysilyl-N-(1,3-dimethyl-butylidene)propylamine, N-phenyl-3-aminopropyl trimethoxysilane, 3-ureidopropyl triethoxysilane, 3-isocyanatopropyl triethoxysilane, 3-glycidoxypropyl trimethoxysilane, 3-glycidoxypropyl methyldiethoxysilane, or 3-glycidoxypropyl triethoxysilane, sliding films all have excellent wear resistance and seizure resistance. Particularly those using 2-(3,4-epoxycyclohexyl)ethyl trimethoxysilane, 3-glycidoxypropyl trimethoxysilane, 3-glycidoxypropyl methyldiethoxysilane or 3-glycidoxypropyl triethoxysilane are preferable in terms of their storage stability.

The data on the sliding film C20 shown in Table 5, C21 to C25 shown in Table 6, and C37 shown in Table 7 indicate that the sliding films formed of coating composition for use in sliding parts that contains titanium oxide powder is more excellent in wear resistance than those formed of coating composition for use in sliding parts that does not contain titanium oxide powder. The sliding films in which the content of titanium oxide powder in PAI resin is more than 35% by mass are less effective in decreasing wear depth.

The data on the sliding film C20 shown in Table 5, C23, C26 and C27 shown in Table 6, and C37 shown in Table 7 indicate that the sliding films formed of coating compositions for use in sliding parts that contains inorganic particles is more excellent in wear resistance than those formed of coating compositions for use in sliding parts that do not contain inorganic particles; however, the sliding films using silicon carbide powder or silica powder as inorganic particles are good in wear resistance to some extent, but poor in seizure resistance. The same is true for the sliding films using alumina powder. In contrast, the sliding films using titanium oxide powder are good in both wear resistance and seizure resistance.

Further, in the sliding films using titanium oxide powder, their surface roughness is smaller and their surface smoothness is more excellent than that of the sliding films using silicon carbide powder or silica powder. To compare with the data on the sliding films C28 and C29 shown in Table 6 indicate that the sliding films using titanium oxide powder exert more excellent effect of preventing solid lubricant from dropping out of the films and have more markedly improved wear resistance than sliding films using an increased amount of solid lubricant. This is because titanium oxide powder has excellent dispersability in binder resin. Although titanium oxide powder having an average primary particle diameter of 0.3 μm is used in the tests, even if titanium oxide powder has an average primary particle diameter of less than 0.3 μm or more than 0.3 μm, as long as it has an average diameter of 1 μm or less, the titanium oxide powder has excellent dispersability in the binder resin and exerts excellent effect of preventing solid lubricant from dropping out of the films, whereby it can provide markedly improved wear resistance.

The data on the sliding film C30 shown in Table 6 and C31 shown in Table 7 show that the sliding films using a silane coupling agent are superior in wear resistance to those using no silane coupling agent. The reason for this is inferred that a silane coupling agent serves to bind solid lubricant and titanium oxide powder firmly to binder resin and bond the same firmly to the substrate.

The present examples and embodiments are to be considered as illustrative and not restrictive and the invention is not to be limited to the details given herein, but may be modified within the scope and equivalence of the appended claims.

The invention claimed is:

1. A wear resistant and seizure resistant film, wherein the film is formed of a coating composition comprising a binder resin, which is polyimide or polyamide-imide, a solid lubricant of polytetrafluoroethylene in an amount of from 15% by mass to 100% by mass based on 100% by mass of the binder resin, titanium oxide powder particles in an amount of from 7.7% by mass to 30.8% by mass based on 100% by mass of the binder resin, and a silane coupling agent in an amount of from 0.2% by mass to 7.7% by mass based on 100% by mass of the binder resin, the solid lubricant, the titanium oxide powder particles and the silane coupling agent being dispersed in the binder resin of the film, and the average primary particle diameter of the titanium oxide powder particles being 1 μm or less, wherein the film is adapted to be formed on a sliding part by applying the coating composition to the sliding part and curing the applied coating composition.

2. The film according to claim 1, wherein the content of the polytetrafluoroethylene relative to the binder resin is in the range between 30% by mass and 80% by mass, inclusive, based on 100% by mass of the binder resin.

3. The film according to claim 1, wherein the content of the titanium oxide powder particles relative to the binder resin is in the range between 10% by mass and 20% by mass, inclusive, based on 100% by mass of the binder resin.

4. The film according to claim 1, wherein the content of the silane coupling agent relative to the binder resin is in the range between 2% by mass and 8% by mass, inclusive, based on 100% by mass of the binder resin.

5. The film according to claim 1, wherein the sliding parts are metal sliding parts.

6. The film according to claim 1, wherein:
the content of the polytetrafluoroethylene relative to the binder resin is in the range between 20.0% by mass and 76.0% by mass, inclusive, based on 100% by mass of the binder resin;
the content of the titanium oxide power particles relative to the binder resin is in the range between 7.7% by mass and 30.8% by mass, inclusive, based on 100% by mass of the binder resin; and
the content of the silane coupling agent relative to the binder resin is in the range between 0.2% by mass and 7.7% by mass, inclusive, based on 100% by mass of the binder resin.

7. The film according to claim 6, wherein the content of the titanium oxide powder particles relative to the binder resin is not less than 15.4% by mass based on 100% by mass of the binder resin.

8. The film according to claim 6, wherein the content of the polytetrafluoroethylene relative to the binder resin is not less than 30.1% by mass based on 100% by mass of the binder resin.

9. The film according to claim 6, wherein the content of the silane coupling agent relative to the binder resin is not less than 1.5% by mass based on 100% by mass of the binder resin.

* * * * *